United States Patent
Fandella

(10) Patent No.: US 7,234,587 B2
(45) Date of Patent: Jun. 26, 2007

(54) CONVEYOR CHAIN LINK

(75) Inventor: Sergio Fandella, Mogliano Veneto (IT)

(73) Assignee: Plastomeccanica S.p.A., Vittorio Veneto (IT)

(*) Notice: Subject to any disclaimer, the term of this patent is extended or adjusted under 35 U.S.C. 154(b) by 0 days.

(21) Appl. No.: 11/029,388

(22) Filed: Jan. 6, 2005

(65) Prior Publication Data
US 2006/0144678 A1 Jul. 6, 2006

(51) Int. Cl.
*B65G 17/24* (2006.01)
(52) U.S. Cl. ............ 198/779; 198/850; 198/851; 198/852; 198/853; 193/35 A; 193/35 B; 193/35 F; 193/35 SS
(58) Field of Classification Search ............ 198/850, 198/851, 852, 853, 779; 193/35 A, 35 B, 193/35 F, 35 SS
See application file for complete search history.

(56) References Cited

U.S. PATENT DOCUMENTS

| | | | | |
|---|---|---|---|---|
| 1,900,149 A | * | 3/1933 | Anderson | 193/35 A |
| 3,789,960 A | * | 2/1974 | Warren | 188/74 |
| 5,261,525 A | * | 11/1993 | Garbagnati | 198/779 |
| 5,330,045 A | * | 7/1994 | Hodlewsky | 198/779 |
| 6,029,802 A | * | 2/2000 | Musiari et al. | 198/852 |
| 6,877,720 B1 | * | 4/2005 | Dublin, Jr. | 254/390 |

* cited by examiner

*Primary Examiner*—Gene O. Crawford
*Assistant Examiner*—Leslie A. Nicholson, III
(74) *Attorney, Agent, or Firm*—Modiano & Associati; Albert Josif; Daniel O'Byrne

(57) ABSTRACT

A link of a conveyor chain comprising a main base body, a supporting element for supporting and retaining at least one supporting shaft with which a plurality of first rollers are rotatably associated, the link being adapted to be articulated to a similar adjacent link so as to form a conveyor chain.

20 Claims, 7 Drawing Sheets

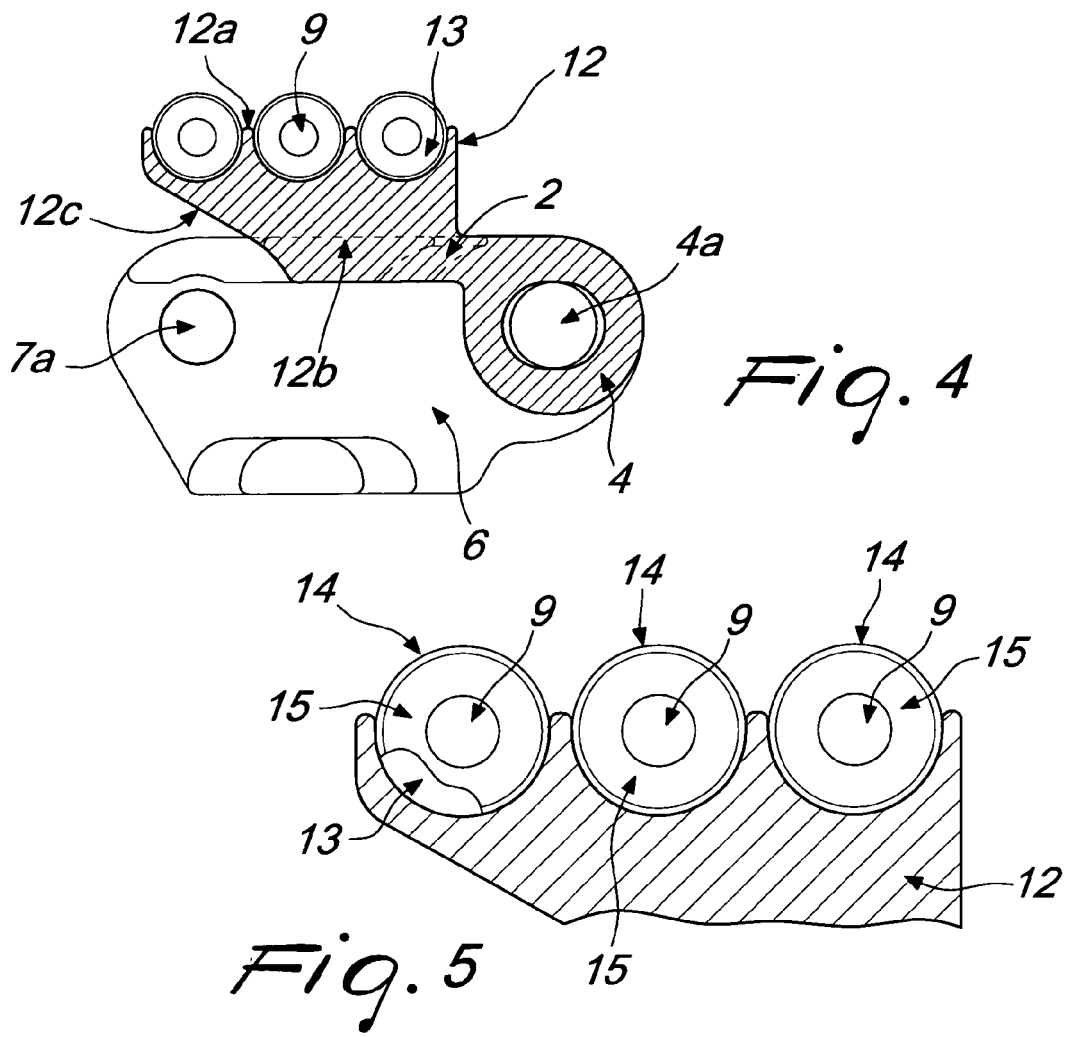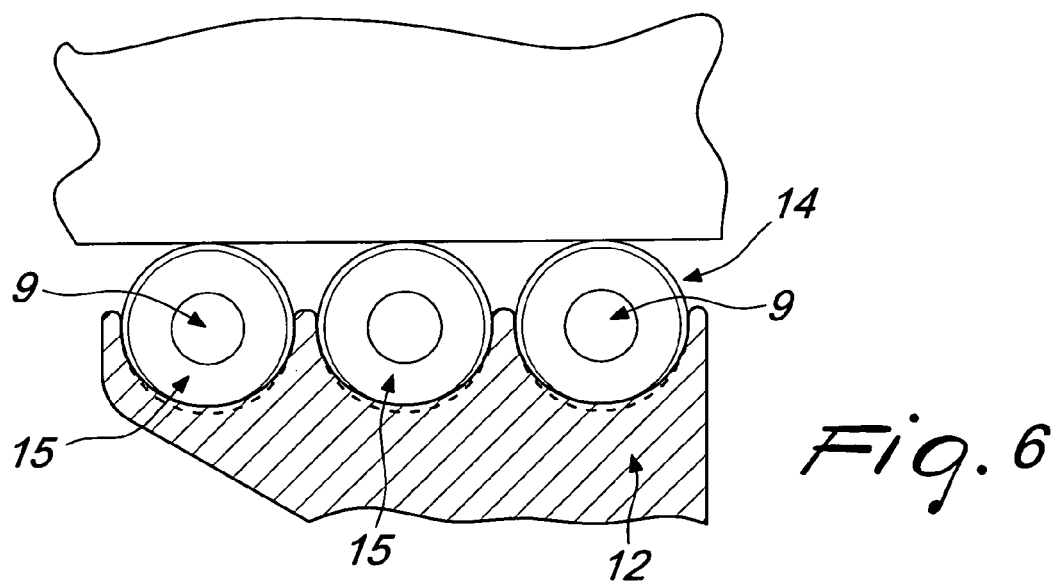

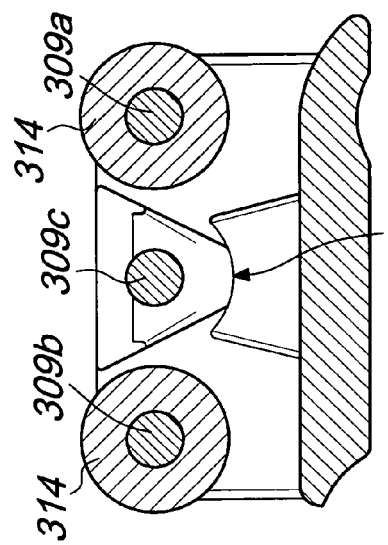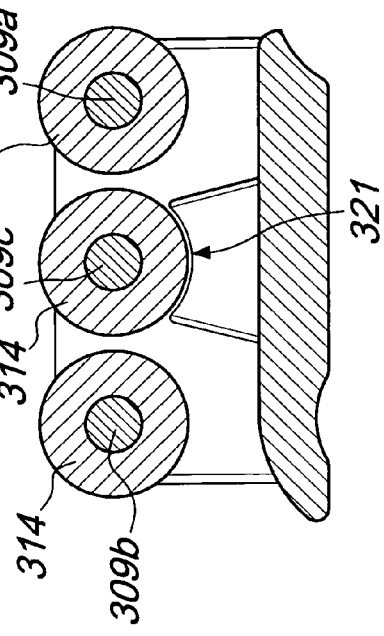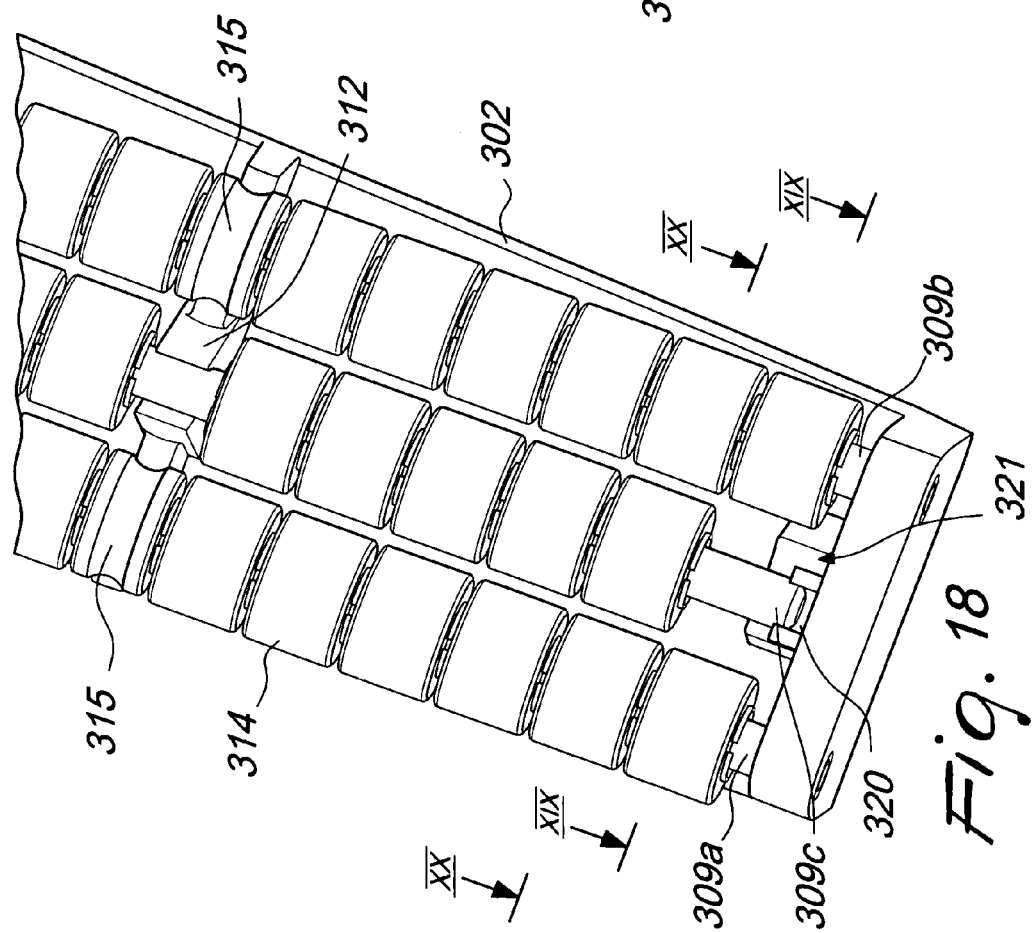

CONVEYOR CHAIN LINK

BACKGROUND OF THE INVENTION

In the production of industrial plants for bottling liquids or for packaging items of various kinds, the design of appropriate systems for transferring the products from one processing station to the next and toward the store is extremely important.

In carrying out the production cycles performed by these plants, it is often necessary to convey and stop the conveyed products in chosen positions, so that it is possible to perform the various steps provided by said process, such as for example filling bottles, closing them, or packaging products of various kinds.

Conveyor chains of a known type are currently used to transfer items within plants in which the operating cycles entail conveying or stopping said products in one or more positions; said known chains are composed of a plurality of links, which are mutually connected so as to form a chosen path, which can comprise straight and curved portions.

One particularly felt requirement is to allow to stop the products in the chosen positions without requiring simultaneous stopping of the conveyor chain, which would entail very complex execution and high operating costs thereof.

For this purpose, it is known to provide conveyor chains that are constituted by interconnecting a plurality of links, each of which comprises a base body that has a substantially rectangular plan shape, on the transverse sides of which one or more shafts are supported, said shafts being arranged longitudinally with respect to the base body and transversely to the direction along which the products advance on said chain, a plurality of rollers being freely rotatably associated with said shafts and constituting the upper conveyance surface of the chain.

In a first known type of link, on the transverse sides of the base body there are a plurality of receptacles, which are approximately U-shaped and open upward, for supporting the one or more shafts, the ends of which are inserted from above into said receptacles.

In a second known type of link, at the transverse sides of its base body, there are a plurality of through holes, which are for example aligned in pairs and within which the ends of the one or more shafts are inserted, being thus supported.

In both of these known kinds of embodiment, if the products to be transferred have considerable dimensions and/or weights, the shafts, in view of their longitudinal extension, are made to rest, in one or more of their intermediate points, on a corresponding number of supports, which protrude upward from the base body and have a receptacle for rotatably accommodating a portion of said shaft.

The presence of the rollers in these known types of link allows both to entrain the products and to stop them without having to stop the movement of the conveyor chain.

The transferred product can in fact be locked in the intended position by means of a retention barrier, without generating intense friction with said chain, by way of the interposition of the rollers, which by rotating about the shaft that supports them reduce drastically said force; in this manner, the presence of motionless objects on the chain does not constitute a hindrance to the travel of said chain.

The main drawback that can be observed in these known types of conveyor chain is the fact that they have an intense wear of the intermediate supports, since the shaft that rests on them in an upper region, if turned by the rollers that it supports, slides continuously on said intermediate supports even in the presence of lightweight loads on the conveyor chain.

Another drawback of known types of conveyor chain is that since each shaft rests directly on the corresponding intermediate support, it is extremely difficult to clean said region of the conveyor chain, and therefore debris that arrives from the outside environment or from the conveyed products, such as for example dust or splinters from the breakage of glass bottles, may jam between the shaft and the intermediate supports, increasing resistance to the advancement of the chain and making it wear faster; accordingly, long line downtimes are needed to perform the necessary cleaning operations.

Another drawback of these known types of conveyor chain is that at the intermediate supports there is a considerable discontinuity in the upper supporting surface, which may give rise to imperfect placement of the product on said chain, especially when it has a small contact base, consequently hindering the correct execution of the cycle of the plant within which said chain is inserted.

SUMMARY OF THE INVENTION

The aim of the present invention is to solve the above-noted problems, eliminating the drawbacks of the cited background art, by providing a conveyor chain link that allows to achieve reduced wear of the conveyor chain even if it is used to convey material of substantial weight or if very long shafts are used.

Within this aim, an object of the invention is to provide a conveyor chain link that allows to perform easy and quick cleaning thereof, so as to reduce line downtimes.

Another object is to provide a conveyor chain link that allows optimum placement of the conveyed products even if they have a small contact base.

Another object is to provide a conveyor chain link that is structurally simple and has low manufacturing costs.

This aim and these and other objects that will become better apparent hereinafter are achieved by a conveyor chain link, comprising a main base body that supports means for supporting and retaining at least one supporting shaft, with which a plurality of free rollers are rotatably associated, said link comprising means that are suitable to connect articulately said chain link to an adjacent similar chain link.

BRIEF DESCRIPTION OF THE DRAWINGS

Further characteristics and advantages of the invention will become better apparent from the following detailed description of a particular but not exclusive embodiment thereof, illustrated by way of non-limiting example in the accompanying drawings, wherein:

FIG. 4 is a sectional view, taken along the line IV—IV of FIG. 1, of a detail of the invention;

FIGS. 5 and 6 are two views, similar to FIG. 4, of a detail of the invention, respectively without a load and loaded;

FIG. 18 is a top perspective view of the invention;

FIG. 19 is a sectional view of the invention, taken along the line XIX—XIX of FIG. 18, in which a first roller has not been associated with the central shaft for the sake of clarity;

FIG. 20 is a sectional view of the invention, taken along the line XX—XX of FIG. 18.

Figure 1:
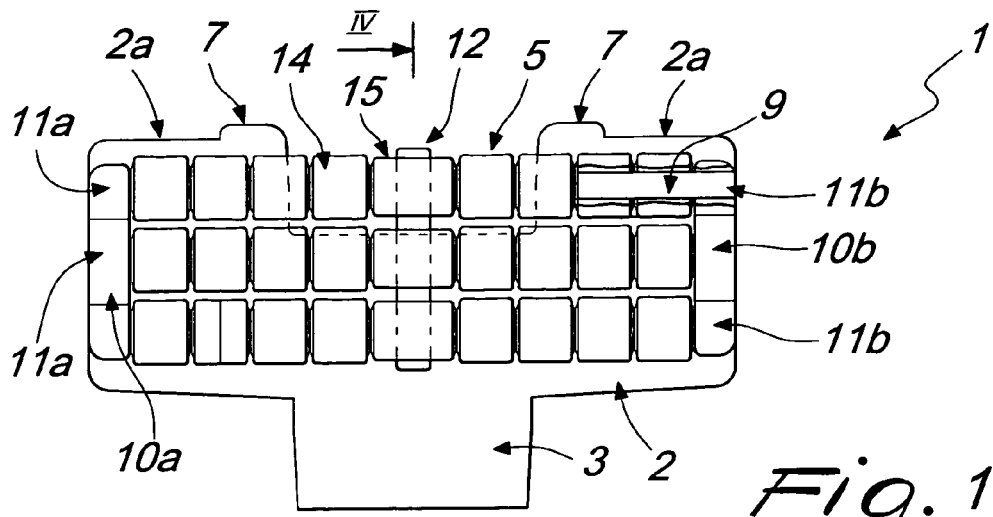
FIG. 1 is a top view of a chain link according to the invention.
Figure 2:
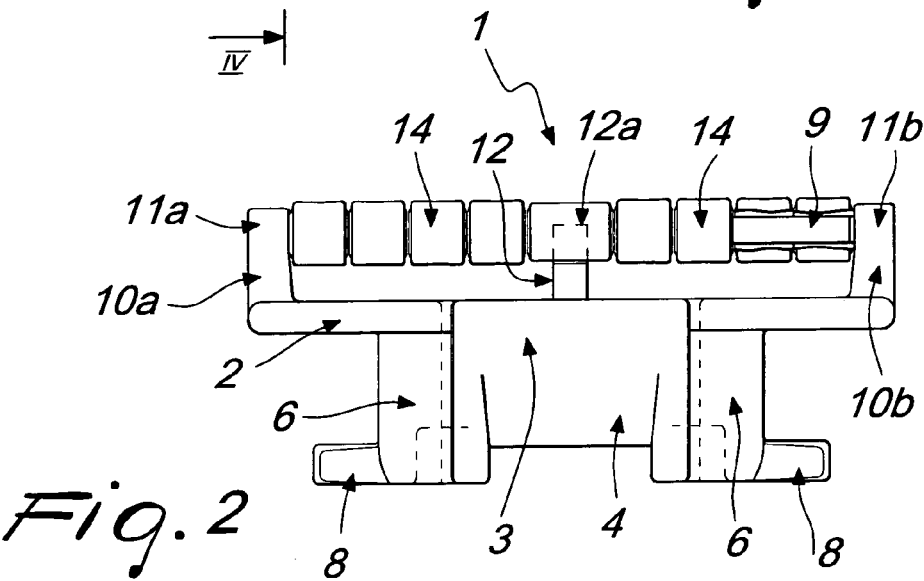
FIGS. 2 and 3 are front views of the invention, respectively without a load and loaded.

In the embodiments that follow, individual characteristics, given in relation to specific examples, may actually be interchanged with other different characteristics that exist in other embodiments.

DESCRIPTION OF THE PREFERRED EMBODIMENTS

With reference to the figures, the reference numeral 1 designates a conveyor chain link according to the invention, which is constituted by a main base body 2, which is approximately flat and has an approximately rectangular plan shape.

Two wings 6 protrude downward from the base body 2 in its central region, are preferably L-shaped, and are arranged symmetrically with respect to a central plane of the link 1.

The link 1 comprises known connection means for articulated connection to a similar adjacent link, so as to allow to provide a conveyor chain that is constituted by a succession of a plurality of identical links 1 arranged consecutively with respect to each other along the advancement direction of said chain.

Said connection means for articulated connection are constituted by a lug 3, which is arranged between the wings 6, protrudes frontally and centrally from the main base body 2, has an approximately trapezoidal plan shape and is arranged so that its shorter parallel side faces forward.

A first bush 4 is formed on the lug 3, proximate to its front end 3a, and is provided with a through hole or slot 4a that is arranged so that its axis lies transversely to the advancement direction of the conveyor chain.

The lug 3 can be accommodated within a first receptacle 5, which is shaped approximately complementarily and is provided centrally at the rear edge 2a of the main base body 2 of an adjacent link 1; the first receptacle 5 has an approximately rectangular plan shape, which is slightly wider than the lug 3 and is open at the rear edge 2a, so as to allow the insertion of said lug within said receptacle with an intended functional play.

The first wings reach the lateral edges 5a of the first receptacle 5.

Two cylindrical ridges 7 are formed on the wings 6 at the lateral edges 5a, and a receptacle 7a is formed inside them; said receptacle preferably has a circular cross-section and is open toward the inside of the link 1, in order to support the ends of a transverse pivot, not shown in the figure, which can be inserted within the through hole or slot 4a formed in the lug 3 in order to ensure the connection between two consecutive links 1.

Said pivot has a smaller diameter than the through hole or slot 4a; further, since the first receptacle 5 is wider than the lug 3, relative rotation between two adjacent links 1 on the advancement plane, which occurs at curved portions of the conveyor chain, is allowed.

The conveyor chain link 1 according to the invention can therefore be used both to provide straight conveyance portions and curved conveyance portions, depending on the requirements of each specific case.

Two tabs 8 can protrude radially in opposite directions from the lower ends of the wings 6, each toward the outside of the link 1; the tabs 8 can be inserted slidingly within complementarily shaped receptacles formed on a guide, not shown in the figures, which can slidingly support the links 1, in order to contrast the forces acting so as to lift said links that can occur for example at curved portions of the conveyor chain.

The main base body 2 supports, on the opposite side with respect to the wings 6 and at the transverse sides, support and retention means for at least one supporting shaft 9 (in FIGS. 4–6, three shafts 9 are shown with one located centrally to the other two), which is arranged longitudinally with respect to the base main base body 2 and transversely with respect to the advancement direction of the conveyance chain.

Said support and retention means briefly called "support means" are constituted by two shoulders 10a and 10b, which protrude upward from the main base body 2 at the lateral ends of the transverse sides and are arranged parallel to the chain advancement direction.

One or more pairs of second receptacles 11a and 11b are formed on the free end of the shoulders 10a and 10b and are each constituted for example by two holes or cavities that are open upward; the second receptacles 11a and 11b of each pair are mutually aligned long an axis that lies longitudinally with respect to the main base body 2 and transversely to the chain advancement direction, so as to act as a support for the supporting shaft 9 at its ends.

If the second receptacles 11a and 11b are constituted by cavities that are open upward, said cavities can affect the shoulders 10a and 10b only along part of their thickness, facing each other and being open toward the inside of the link; if the second receptacles are constituted by holes, at least one of them is a through hole in order to allow positioning of the supporting shaft 9.

A plurality of first rollers 14 are rotatably associated with each supporting shaft 9 and are provided with axial holes for the passage of said shaft.

At least one supporting means protrudes upward from the main base body 2 toward the first rollers 14 and can be activated when a load passes over said shaft; said at least one supporting means is constituted by a protrusion 12 that has an approximately rectangular plan shape, is parallel to the shoulders 10a and 10b, and is arranged advantageously in a central region between them, preferably at the longitudinal central axis of the link 1.

The protrusion 12 has, in a side view, approximately the shape of an inverted right-angled trapezoid, in which the longer parallel side 12a is directed upward and the shorter parallel side 12b is rigidly coupled to the main base body 2; the longer parallel side 12a has approximately the same extension as the shoulders 10a and 10b and is arranged thereat.

One or more third receptacles 13 are provided above the protrusion 12, in a number that matches the number of pairs of second receptacles 10a and 10b and are aligned with them, each along an axis that is longitudinal with respect to the main base body and transverse with respect to the advancement direction of the conveyor chain.

Advantageously, each one of the third receptacles 13 affects or extends over the protrusion 12 through its entire thickness and has an approximately semicircular cross-sectional shape, which is open upward and arranged coaxially to the second receptacles 11*a* and 11*b*.

The first rollers 14 have a diameter that is approximately equal to, or greater than, the diameter of the third receptacles 13.

Advantageously, the first rollers 14 are arranged along the entire supporting shaft 9, except for the ends, which can be inserted in the shoulders 10*a* and 10*b*, and for the central portion thereof; at said central portion of each supporting shaft 9, at least one second roller 15 is freely rotatably associated with said shaft, is provided with an axial hole and has a smaller diameter than the third receptacles 13 and the first rollers 14.

The ends of each supporting shaft 9 can be accommodated within the second receptacles 11*a* and 11*b* formed on the shoulders 10*a* and 10*b*, so that said shaft is supported by said receptacles and is arranged transversely with respect to the advancement direction of the conveyor chain.

The first rollers 14 are arranged along the two lateral portions of the shaft 9, at the regions comprised between the shoulders 10*a* and 10*b* and the protrusion 12, which is arranged in a central region.

The second rollers 15 are instead arranged at the central portion of the or each supporting shaft 9, at the protrusion 12; since said second rollers have a smaller diameter than the third receptacles 13 and are supported rotatably by the supporting shaft 9, they do not rest on said third receptacles when the supporting shaft is arranged in a rectilinear configuration, for example when there is no load on the first rollers 14.

The operation of the conveyor chain link according to the invention entails that if no load, or a light load constituted for example by an empty bottle, is present on a supporting shaft 9, said supporting shaft has an approximately rectilinear non-deformed configuration, so that said at least one second roller 15, which is rotatably associated with the supporting shaft 9, is raised with respect to the respective facing third receptacle 13.

In this operating condition, the supporting shaft 9 is rotatably associated only with the shoulders 10*a* and 10*b*, while the first and second rollers 14 and 15 are free to rotate in order to allow relative sliding of the product that they support with respect to the link 1, for example if said product that they support is locked in a chosen position by a retention barrier; accordingly, low friction resistance to the advancement of the conveyor chain is generated.

Figure 3:
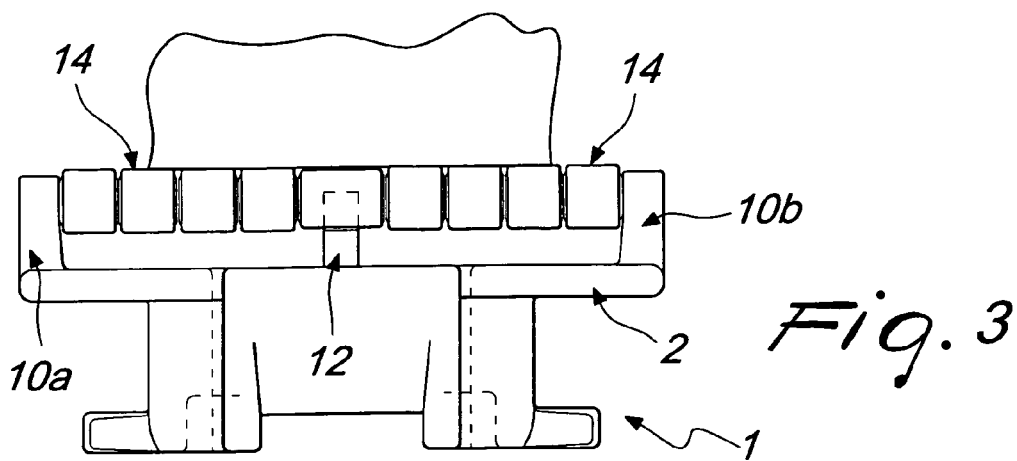
Figure 7:
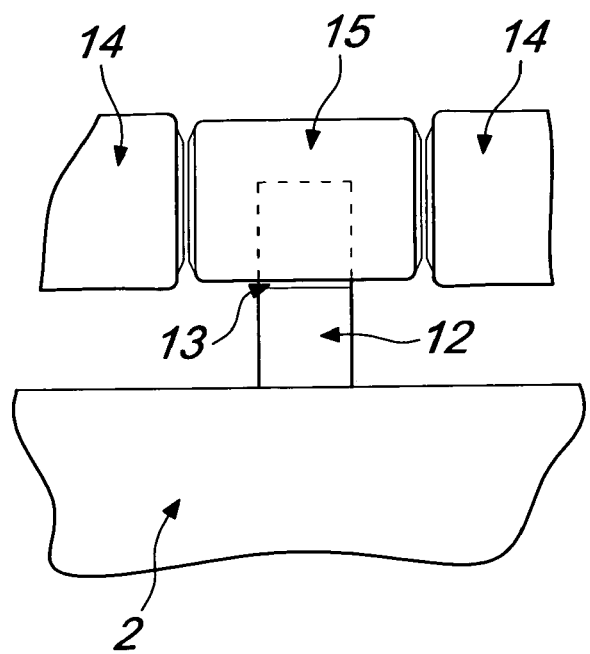
FIGS. 7 and 8 are views of a detail of the invention, respectively without a load and loaded.
Figure 8:
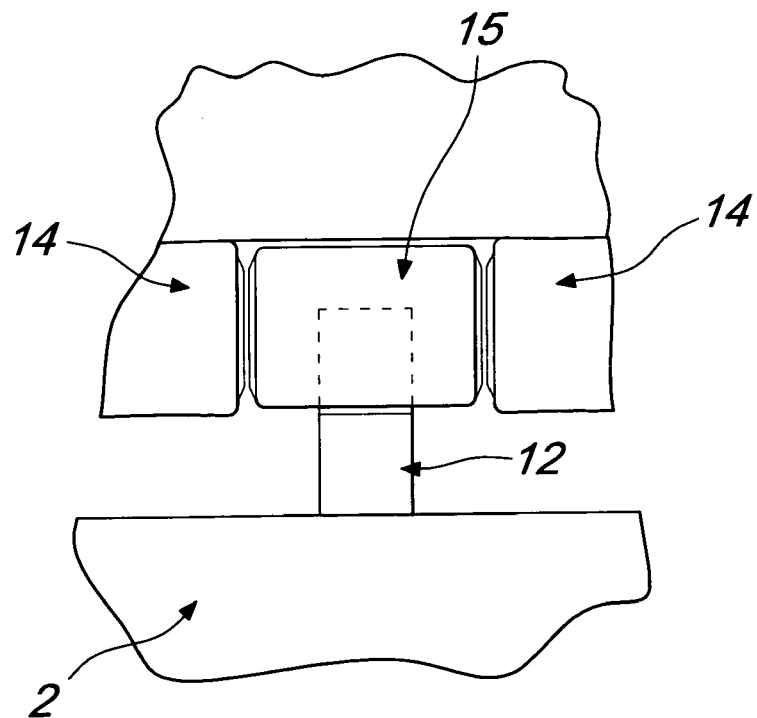
Figure 9:
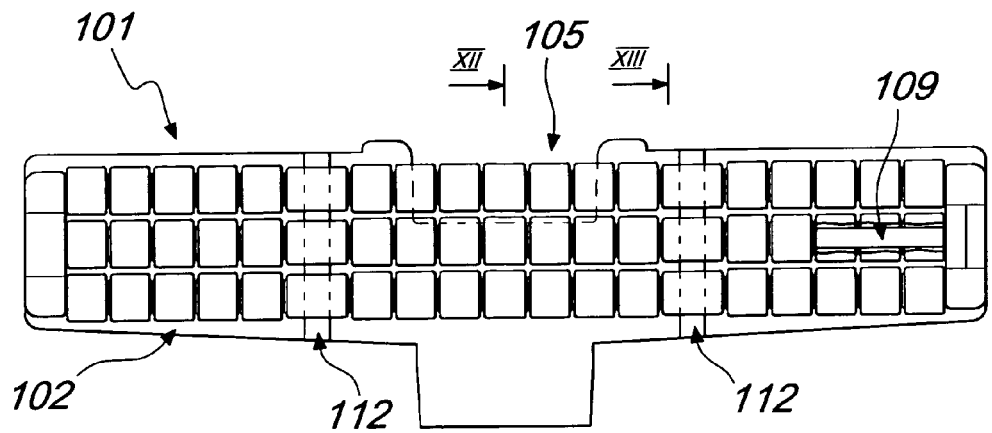
FIG. 9 is a top view of a second embodiment of a chain link according to the invention.
Figure 10:
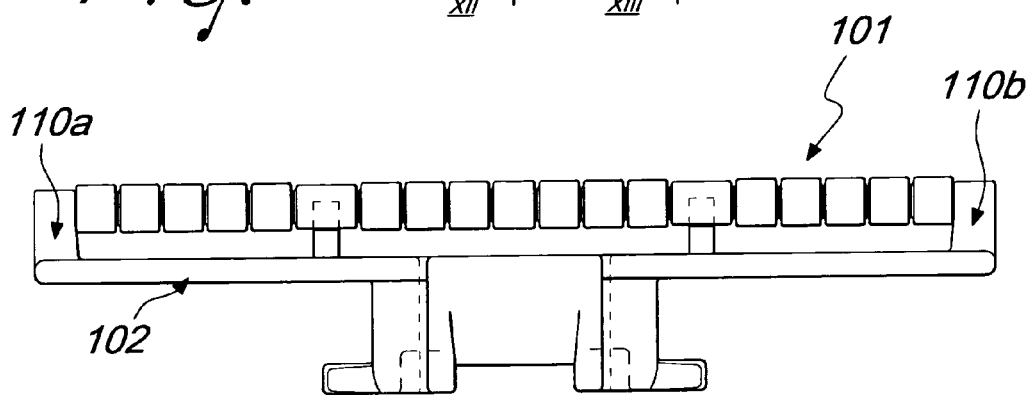
FIGS. 10 and 11 are front views of said second embodiment of the invention, respectively without a load and loaded.
Figure 11:
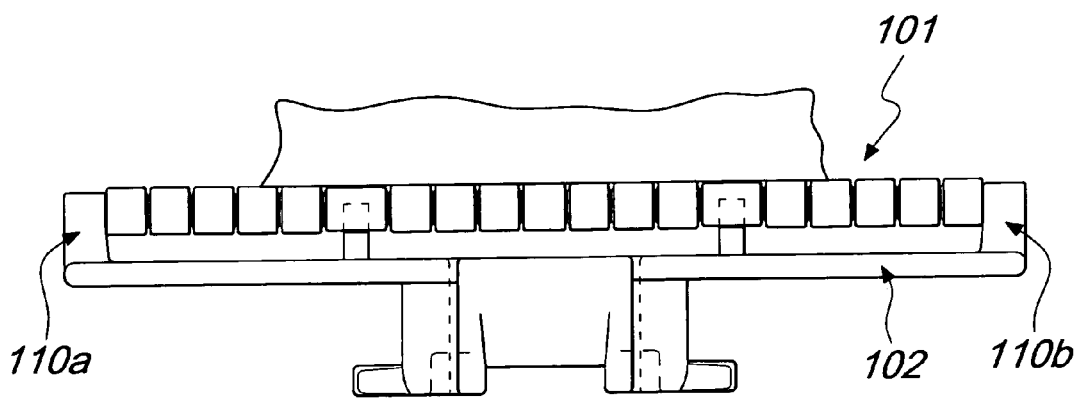
Figure 12:
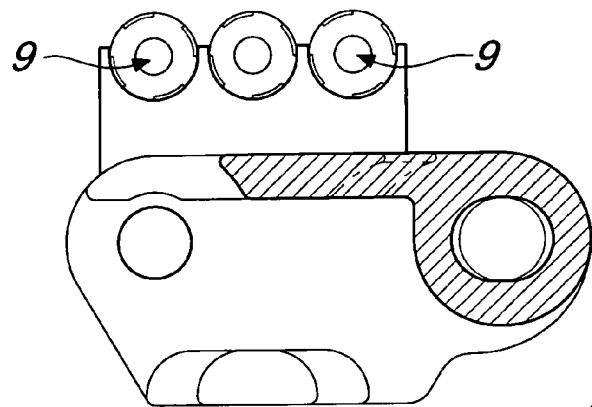
FIG. 12 is a sectional view, taken along the line XII—XII of FIG. 9, of a detail of the invention.
Figure 13:
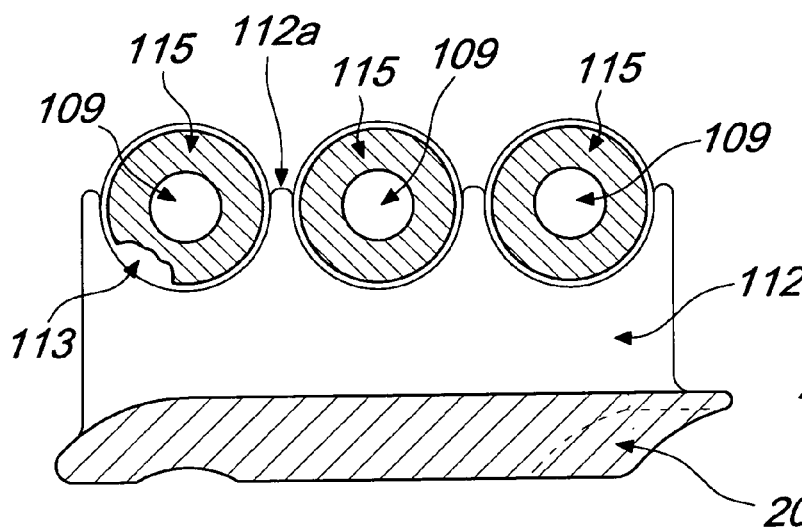
FIGS. 13 and 14 are two sectional views, taken along the line XIII—XIII of FIG. 9, of a detail of the invention, respectively without a load and loaded.
Figure 14:
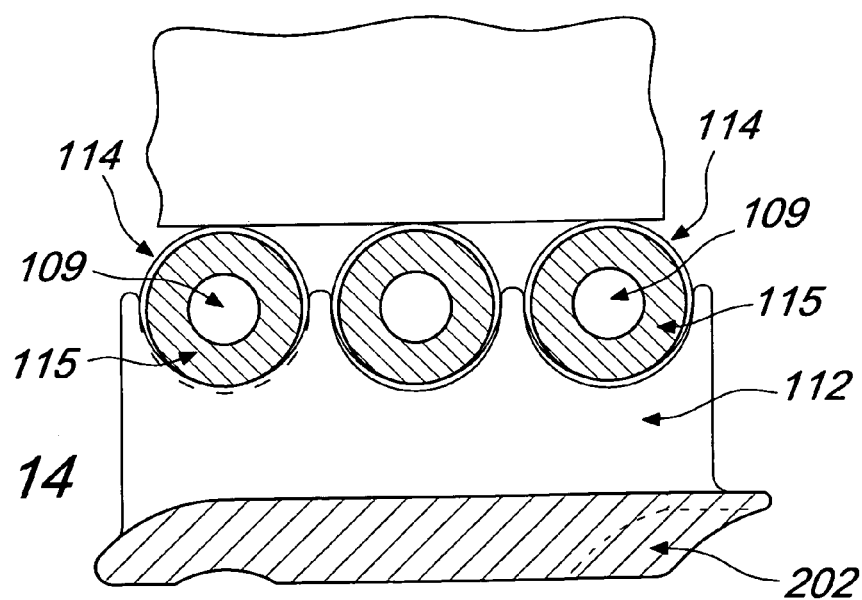

If the load carried by the link 1 has a considerable weight, the supporting shaft 9 is arranged in a deformed configuration, shown by way of qualitative example in FIGS. 3, 6 and 8, the maximum downward displacement of which occurs particularly if the load is arranged approximately centrally with respect to the link 1, proximate to the protrusion 12.

If the weight of said load exceeds a preset value, which can be defined for example analytically or experimentally, the lateral surface of said at least one second roller 15 makes contact with the corresponding surface of the third receptacle 13, so as to constitute a third central supporting point for the supporting shaft 9.

In this condition, the second roller 15 does not rotate freely, since it is locked by the friction between its lateral surface and the surface of the third receptacle 13; the presence of the second roller 15, however, avoids wear of the protrusion 12, since there is no direct contact between the rotating supporting shaft 9 and the fixed surface of the third receptacle 13.

Further, said at least one second roller 15 rests on the surface of the third receptacle 13 and remains locked in its rotation only if the weight of the conveyed load exceeds a preset value; accordingly, wear processes are further slowed, since if a lightweight object is being carried, the second roller 15 is not in contact with the protrusion 12 and therefore can rotate freely, since no action is applied to the protrusion 12.

If there is debris on the link 1, constituted for example by glass splinters originating from the breakage of conveyed bottles or by dirt that arrives from the surrounding environment, it is further very easy to clean said link even at the central support.

Since the second roller 15, if there is no load or if there is a reduced load, is in fact raised from the surface of the third receptacle 13, easy access is allowed to said central region with conventional cleaning tools, such as for example jets of compressed air or brushes having a suitable site shape.

The presence of said at least one second roller 15 further allows to achieve good uniformity of the upper loading surface, since the difference between the outside parameters of the first and second rollers can be very small; good positioning is thus ensured even in the case of products that have a small contact base.

FIGS. 9 to 14 illustrate a second embodiment of the link 101 according to the invention, which provides for the presence of two protrusions 112, which protrude upward from the main base body 102 and are approximately shaped like a parallelepiped, on the upper base 112*a* of which the plurality of third receptacles 113, which have an approximately semicircular cross-section, is formed.

The mutually identical protrusions 112 are arranged laterally with respect to the region affected by the first receptacle 105 and are arranged preferably symmetrically with respect to a longitudinal central axis of the link 101.

A plurality of first rollers 114 and at least two second rollers 115 are rotatably associated with each supporting shaft 109, which is supported at its ends by the shoulders 110*a* and 110*b*; the at least two second rollers 115 are arranged respectively at the two protrusions 112, so that the first rollers 114 are divided into three groups that are arranged respectively in the regions comprised between each shoulder and a protrusion 112 that is closest to said shoulder and in the region comprised between the two protrusions 112.

In this embodiment also, the second rollers 115 have an outside diameter that is advantageously smaller than the outside diameter of the third receptacles 113 and the first rollers 114, so that if there is no load or there are lightweight loads on the supporting shaft 109, said rollers are raised with respect to the bottom of said third receptacles.

In these conditions, the supporting shaft 109 is supported only at its ends by the shoulders 110*a* and 110*b*, while the second rollers 115 can rotate freely.

If the weight of the load that is present on the supporting shaft 109 exceeds a preset value, the deformation of the shaft itself entails a downward movement of the second rollers 115 so as to place the lateral surfaces of one or both of said rollers in contact with the surfaces of the third receptacles 113.

In these conditions, the supporting shaft 109 is therefore supported also at one or both of the protrusions 112, ensuring adequate reaction to the load that is present and preventing its deformation from exceeding a preset. limit.

Said embodiment is particularly suitable if the link 101 is very wide and therefore requires very long supporting shafts 109, which might have an excessive deformation, if only one protrusion 112 were provided, if affected by heavy nodes.

Figure 15:
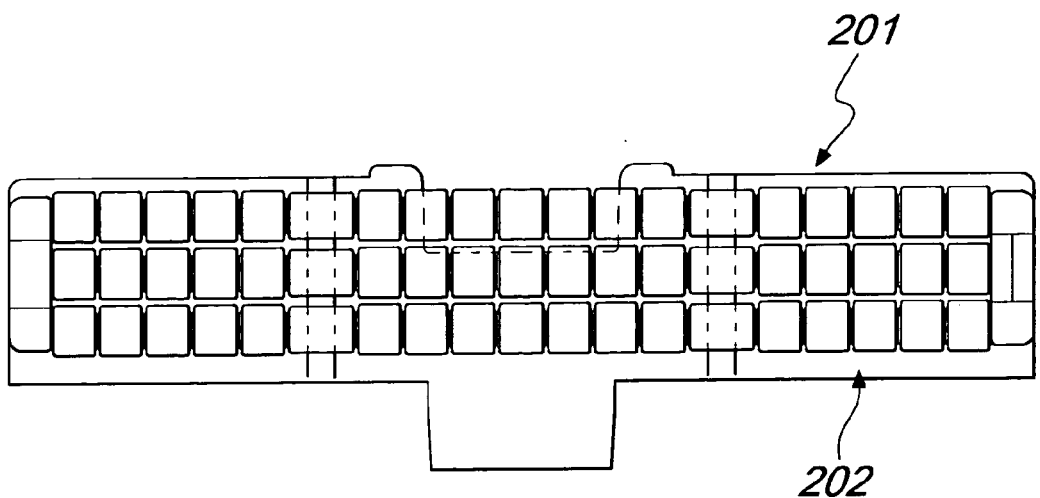
FIG. 15 is a top view of a third embodiment of a chain link according to the invention.
Figure 16:
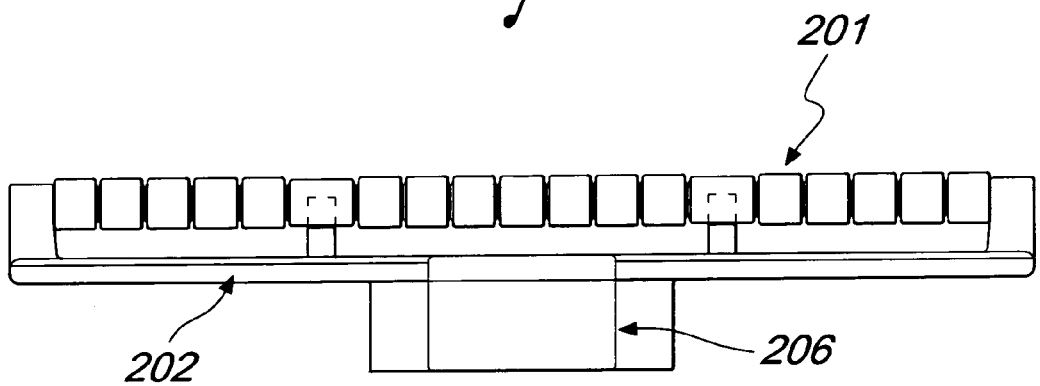
FIGS. 16 and 17 are front views of said third embodiment of the invention, respectively without a load and loaded.
Figure 17:
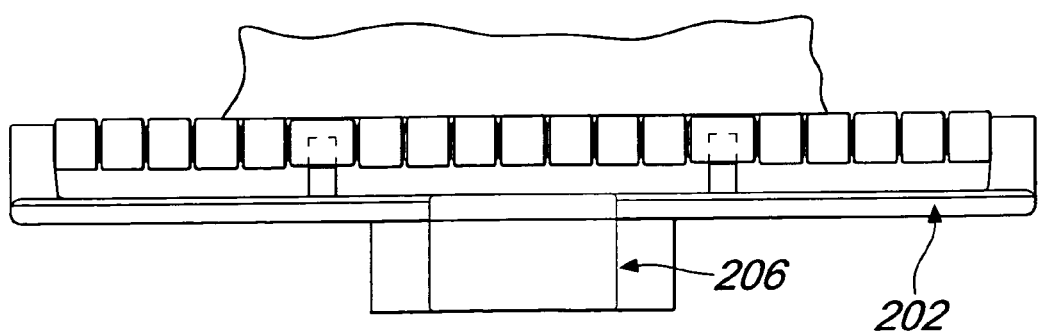

FIGS. 15, 16 and 17 illustrate another embodiment for the invention 201, which differs from the preceding ones in that the wings 206, which protrude downward from the main base body 202, are approximately rectilinear and have no tabs that protrude toward the outside of the link 201.

All the embodiments of the invention are further suitable for providing both rectilinear and curved conveyor chains, depending on the requirements dictated by each individual case of application.

Particularly for curved conveyor chains, FIGS. 18, 19 and 20 illustrate another embodiment, in which there is a main base body 302, which supports, at its ends, supporting and retention means for two shafts 309*a* and 309*b*, with which a plurality of first free rollers 314 are rotatably associated; there is also an additional central shaft 309*c*, which is interposed between said pair of shafts 309*a* and 309*b*, with which first rollers 314 are again associated.

The central shaft 309*c* is supported rotatably at its ends by means of a first roller 314, which rests rotatably on a complementarily shaped guide 321 that protrudes from said main base body 302 in a region that is intermediate between the ends of the pair of shafts 309*a* and 309*b*.

The central shaft 309*c* is instead supported in one or more central regions by at least one supporting means 312, which can be activated when a load passes over said central shaft, said at least one supporting means interacting selectively with second rollers, which are similar to the ones designated by the reference 315 and are associated with the pair of shafts 309*a* and 309*b*, which are rotatably associated with said central shaft and have a smaller diameter than the first rollers 314.

It has thus been found that the invention has achieved the intended aim and objects, a conveyor chain link having been provided which allows to ensure low wear thereof during operation as well as easy and quick cleaning thereof, so as to require reduced line downtimes.

Finally, the invention allows optimum placement of the conveyed products even if said products have a small contact base.

The materials used, as well as the dimensions that constitute the individual components of the invention, may of course be more pertinent according to specific requirements.

Those skilled in the art would understand that the various means for performing certain different functions described in the present specification need not certainly coexist only in the illustrated embodiment but can be present per se in alternative embodiments, including ones that are not illustrated, and which are still intended to be comprised within the scope of the appended claims.

The characteristics indicated as being advantageous, convenient or the like it may also be omitted or replaced by equivalents.

What is claimed is:

1. A conveyor chain link, comprising:
   a main base body;
   at least one supporting shaft with a plurality of free rollers rotatably associated therewith;
   supporting means supported at said base body for supporting and retaining said at least one supporting shaft, said supporting means comprising at least one protrusion supported at said base body in a fixed position with respect to said base body and having at least one receptacle arranged below a corresponding one of said free rollers such that when said chain link is not loaded said supporting shaft is arranged in an approximately rectilinear non-deformed configuration and said at least one of said free rollers is arranged distally from and disengaged from said at least one receptacle of said at least one protrusion and such that when said chain link carries a bending load said at least one supporting shaft bends into a deformed configuration and said at least one of said free rollers engages said at least one receptacle; and
   connection means for articulately connecting the chain link to an adjacent similar chain link.

2. The link of claim 1, wherein said at least one receptacle has a semi-cylindrical shape with a diameter greater than the diameter of said one of said free rollers arranged above said at least one receptacle.

3. A conveyor chain link, comprising:
   connection means for articulated connection of the link to a similar and adjacent link;
   at least one supporting shaft, with a plurality of first free rollers rotatably associated therewith;
   second rollers, which are rotatably associated with said shalt and have a smaller diameter than said first rollers;
   a main base body;
   supporting means supported at ends of said base body, for supporting and retaining said at least one supporting shaft,
   wherein at least one of said supporting means comprises at least one protrusion that is supported at the base body in a fixed position with respect to said base body so as to protrude therefrom from said main base body toward said second rollers for being activated upon passage of a bending load thereover, said protrusion interacting selectively with at least one of said second rollers, said at least one protrusion having at least one receptacle arranged below said at least one of said second rollers such that when said chain link is not loaded said supporting shaft is arranged in an approximately rectilinear non-deformed configuration and said at least one of said second rollers is arranged distally from and disengaged from said at least one receptacle of said at least one protrusion and such that when said chain link carries said bending load said at least one supporting shaft bends into a deformed configuration and said at least one of said second rollers engages said at least one receptacle.

4. The link of claim 3, wherein said at least one receptacle has a semi-cylindrical shape with a diameter greater than the diameter of said at least one of said second rollers arranged above said at least one receptacle.

5. A conveyor chain link, comprising:
   connection means for articulated connection of the link to a similar and adjacent link;
   a pair of shafts with a plurality of first free rollers rotatably associated therewith;
   a main base body;
   support and retention means for supporting and retaining a central shaft, which is interposed between said pair of shafts and with which said first rollers are associated;
   a guide that protrudes from said main base body and is supported at central regions thereof by said support and retention means, said central shaft being supported rotatably at its ends by one of said first rollers, that are rotatably slidable on said guide;

at least one supporting means that is activatable when a bending load passes over said central shaft and which protrudes from said main base body towards said first rollers; and second rollers which are rotatably associated with said pair of shafts and have a smaller diameter than said first rollers, said at least one supporting means comprising at least one protrusion interacting selectively with said second rollers, said at least one protrusion being supported at the base body in a fixed position with respect said base body and comprising at least one receptacle arranged below said second rollers such that when said chain link is not loaded said supporting shaft is arranged in an approximately rectilinear non-deformed configuration and said second rollers are arranged distally from and disengaged from said at least one receptacle of said at least one protrusion and such that when said chain link carries said bending load said central shaft bends into a deformed configuration and said second rollers engage said at least one receptacle.

6. The link of claim 5, wherein said central shaft, interposed between said pair of shafts, is rotatably supported at ends thereof by way of one of said first rollers, which acts rotatably on the guide that is shaped complementarily and protrudes from said main base body in an intermediate region between ends of said pair of shafts.

7. The link of claim 6, wherein said central shaft is supported in at least one central region thereof by said at least one protrusion, that is activatable when a load passes over said central shaft, said at least one receptacle of said at least protrusion interacting selectively with said second rollers that are rotatably associated with said central shaft and have a smaller diameter than said first rollers.

8. The link of claim 5, wherein said at least one receptacle has a semi-cylindrical shape with a diameter greater than the diameter of said second rollers arranged above said at least one receptacle, whereby when said chain link is loaded by said bending load said first and second rollers have upper surfaces arranged on a common support plane.

9. A conveyor chain link, comprising:
connection means for articulately connecting the link to a similar and adjacent link;
at least one supporting shaft, with a plurality of free rollers rotatably associated therewith;
a main base body;
supporting means supported at ends of said base body for supporting and retaining said at least one supporting shaft,
wherein at least one of said supporting means comprises at least one protrusion that is supported at the base body in a fixed position with respect to said base body so as to protrude therefrom towards said free rollers in order to be activatable upon passing over said shaft of a bending load, said at least one protrusion having at least one receptacle arranged below a corresponding at least one of said free rollers such that when said chain link is not loaded said supporting shaft is arranged in approximately rectilinear non-deformed configuration and said at least one of said free rollers is arranged distally from and disengaged from said at least one receptacle of said at least one protrusion and such that when said chain link carries said bending load said at least one supporting shaft bends into a deformed configuration and said at least one of said free rollers engages said at least one receptacle.

10. The link of claim 9, wherein said at least one receptacle has a semi-cylindrical shape wit a diameter greater than the diameter of said at least one of said free rollers arranged above said at least one receptacle.

11. The link of claim 9, wherein said supporting means comprise two shoulders, which protrude upward from the ends of transverse sides of said main base body parallel to an advancement direction of the chain link, and wherein said at least one protrudes upward from said main base body towards said of said free rollers, said at least one protrusion having a substantially rectangular shape viewed from above and being arranged parallel to said pair of shoulders.

12. The link of claim 11, comprising at least two protrusions that protrude from said main base body and are mutually equidistant with respect to each other and with respect to said pair of shoulders.

13. The link of claim 11, wherein said at least one protrusion is arranged in a central region of the base body between said pair of shoulders, at a longitudinal central axis of the link.

14. The link of claim 13, wherein said at least one protrusion has, in a side view, the shape of an inverted right-angled trapezoid, in which a longer parallel side is directed upward and a shorter parallel side is rigidly coupled to said main base body, said longer parallel side being substantially as long as said pair of shoulders.

15. The link of claim 14, wherein at least one pair of second receptacles is formed on a free end of said pair of shoulders, said second receptacles being each constituted by two holes or cavities that are open upward, said second receptacles of said at least one pair being mutually aligned along an axis that is longitudinal with respect to said main base body and transverse with respect to the advancement direction of the chain link, in a conveyor chain so as to act as a support for said supporting shaft at ends thereof, and wherein said at least one receptacle of said at least one protrusion comprises third receptacles formed above said at least one protrusion, said third receptacles being provided in a number that is equal to a number of pairs of second receptacles formed on the free end of said pair of shoulders and being aligned therewith, each along an axis that is longitudinal with respect to said main base body and is transverse with respect to the advancement direction of the conveyor chain.

16. The link of claim 15, wherein each one of said third receptacles extends over said protrusion along its entire thickness and has a substantially semicircular cross-section that is open upward.

17. The link of claim 15, wherein said free rollers comprise first rollers that have a diameter that is approximately equal to, or greater than, a diameter of said third receptacles.

18. The link of claim 17, wherein said first rollers are arranged along all of said supporting shah except for the ends thereof which are insertable in said shoulders, and except at least for a central portion of said shaft, said at least one of said free rollers arranged above said protrusion comprising at least one second roller of said free rollers that is provided so as to be freely rotatably associated at said central portion of the supporting shaft, said second roller being axially perforated and having a diameter that is smaller than the diameter of said third receptacles and of said first rollers.

19. The link of claim 18, wherein said at least one second roller is arranged at said central portion of said supporting shaft at said protrusion.

20. The link of claim 18, wherein said at least one second roller has a smaller diameter than said third receptacles and is supported rotatably by said supporting shaft, said at least one second roller being located away from said third receptacles when said supporting shaft is free from said bending load action that slides on said first rollers.

* * * * *